(12) United States Patent
Pauskar et al.

(10) Patent No.: US 9,945,419 B2
(45) Date of Patent: Apr. 17, 2018

(54) RETAINER

(71) Applicant: The Timken Company, North Canton, OH (US)

(72) Inventors: Praveen Pauskar, Massillon, OH (US); Richard J. Abbruzzi, Canton, OH (US)

(73) Assignee: The Timken Company, North Canton, OH (US)

( * ) Notice: Subject to any disclaimer, the term of this patent is extended or adjusted under 35 U.S.C. 154(b) by 203 days.

(21) Appl. No.: 14/903,859

(22) PCT Filed: Aug. 25, 2014

(86) PCT No.: PCT/US2014/052503
§ 371 (c)(1),
(2) Date: Jan. 8, 2016

(87) PCT Pub. No.: WO2015/031247
PCT Pub. Date: Mar. 5, 2015

(65) Prior Publication Data
US 2017/0002864 A1    Jan. 5, 2017

Related U.S. Application Data

(60) Provisional application No. 61/870,375, filed on Aug. 27, 2013.

(51) Int. Cl.
*F16C 33/44* (2006.01)
*F16C 33/38* (2006.01)
(Continued)

(52) U.S. Cl.
CPC .............. *F16C 33/44* (2013.01); *B33Y 10/00* (2014.12); *B33Y 80/00* (2014.12); *F16C 33/38* (2013.01);
(Continued)

(58) Field of Classification Search
None
See application file for complete search history.

(56) References Cited

U.S. PATENT DOCUMENTS 2,569,531 A * 10/1951 Kunzog ................. F16C 19/10
                                                            384/615
3,361,499 A    1/1968 Kearns
(Continued)

FOREIGN PATENT DOCUMENTS

CN         1093494        10/1996
CN         101186985      5/2008
(Continued)

OTHER PUBLICATIONS

Russian Patent Office Search Report for Application No. 2016111119 dated May 30, 2017 (3 pages, statement of relevance included).

(Continued)

*Primary Examiner* — James Pilkington
(74) *Attorney, Agent, or Firm* — Michael Best & Friedrich LLP

(57) ABSTRACT

A retainer (30) for maintaining a relative angular spacing of a plurality of rolling elements includes a body (34) having an annular portion (38) and a plurality of engaging portions (42). Each of the engaging portions is configured to engage at least one of the plurality of rolling elements. The body is made of a sintered powdered metal infiltrated with bronze.

24 Claims, 3 Drawing Sheets

(51) Int. Cl.
*F16C 33/46* (2006.01)
*B33Y 10/00* (2015.01)
*B33Y 80/00* (2015.01)
*F16C 33/56* (2006.01)

(52) U.S. Cl.
CPC .............. *F16C 33/46* (2013.01); *F16C 33/56* (2013.01); *F16C 2204/10* (2013.01); *F16C 2204/60* (2013.01); *F16C 2204/62* (2013.01); *F16C 2204/64* (2013.01); *F16C 2220/20* (2013.01); *F16C 2220/24* (2013.01); *F16C 2223/02* (2013.01)

(56) References Cited

U.S. PATENT DOCUMENTS

| | | | |
|---|---|---|---|
| 3,582,164 A | | 6/1971 | Derner et al. |
| 3,955,862 A | * | 5/1976 | Batt .................. F16C 19/30 29/898.067 |
| 5,076,869 A | | 12/1991 | Bourell et al. |
| 5,147,587 A | | 9/1992 | Marcus et al. |
| 5,387,380 A | * | 2/1995 | Cima .................... B05C 19/04 264/109 |
| 5,540,883 A | | 7/1996 | Jones et al. |
| 5,622,434 A | | 4/1997 | Takahashi |
| 5,932,055 A | | 8/1999 | Newell et al. |
| 6,508,980 B1 | | 1/2003 | Sachs et al. |
| 8,057,101 B2 | | 11/2011 | Shimizu et al. |
| 8,230,599 B2 | | 7/2012 | Kim et al. |
| 8,454,240 B2 | * | 6/2013 | Doyer ................. F16C 33/416 384/470 |
| 8,814,437 B2 | * | 8/2014 | Braun ................ B29C 67/0051 29/898.067 |
| 9,291,199 B2 | * | 3/2016 | Foster ................ F16C 33/6696 |
| 9,334,900 B2 | * | 5/2016 | Chriss .................. F16C 19/184 |
| 9,637,811 B2 | * | 5/2017 | Fukae ................. C22C 33/0221 |
| 2007/0009757 A1 | | 1/2007 | Takayama et al. |
| 2008/0106853 A1 | | 5/2008 | Suenaga |
| 2010/0044903 A1 | | 2/2010 | Rhoades et al. |
| 2013/0000553 A1 | | 1/2013 | Hoechsmann et al. |
| 2013/0148919 A1 | | 6/2013 | Matsuo et al. |
| 2013/0216174 A1 | | 8/2013 | Braun |

FOREIGN PATENT DOCUMENTS

| | | | |
|---|---|---|---|
| CN | 201170262 | | 12/2008 |
| DE | 1525145 | | 8/1969 |
| DE | 102008013285 | A1 | 9/2009 |
| DE | 102010034962 | A1 | 2/2012 |
| DE | 112011101737 | T5 | 6/2013 |
| DE | 102012202104 | A1 | 8/2013 |
| EP | 2389285 | A1 | 11/2011 |
| EP | 2389286 | A1 | 11/2011 |
| EP | 2391499 | A2 | 12/2011 |
| EP | 2507036 | A1 | 10/2012 |
| EP | 2507037 | A2 | 10/2012 |
| EP | 2543498 | A2 | 1/2013 |
| JP | 2005-155696 | * | 6/2005 |
| JP | 2007-120687 | | 5/2007 |
| JP | 2007-127251 | | 5/2007 |
| JP | 2007-247755 | | 9/2007 |
| SU | 290134 | | 12/1970 |
| WO | 2004001238 | A2 | 12/2003 |
| WO | 2008103984 | A2 | 8/2008 |
| WO | 2008103984 | A3 | 8/2008 |
| WO | 2008103985 | A2 | 8/2008 |
| WO | 2008103985 | A3 | 8/2008 |
| WO | 2011/145693 | | 11/2011 |
| WO | WO2012022616 | * | 2/2012 |
| WO | WO2012025717 | * | 3/2012 |
| WO | 2015031247 | A2 | 3/2015 |

OTHER PUBLICATIONS

Design World Online, "With 3D printing materials, knowledge is power" <http://www.designworldonline.com/3d-printing-materials-knowledge-power/?utm_source=feedburner&utm_medium=feed&utm_campaign=Feed%3A+DesignWorldOnline+> webpage accessed May 12, 2014.
Power Transmission Design, "Bearings," 1998, 17 pages.
International Search Report and Written Opinion for Application No. PCT/US2014/052503 dated Feb. 20, 2015 (10 pages).
Chinese Patent Office Action for Application No. 201480047737.7 dated Apr. 20, 2017 (27 pages, English translation included).
Fengman et al., "Development of a Solid Self-Lubrication Antifriction Material and its Application," Journal of Iron and Steel Research, 1990, vol. No. 2, pp. 67-73.
Fengman et al., "Solid Self-lubrication Antifriction Materia," New Technology New Process, No. 1, 1991, pp. 9-10.

* cited by examiner

RETAINER

CROSS-REFERENCE TO RELATED APPLICATIONS

This application claims priority to U.S. Provisional Patent Application No. 61/870,375 filed on Aug. 27, 2013, the entire content of which is incorporated herein by reference.

FIELD OF THE INVENTION

The invention relates to retainers, and more particularly to methods of manufacturing retainers.

BACKGROUND OF THE INVENTION

A retainer, also commonly referred to as a cage, is a common component in bearings, constant-velocity joints, and other types of rotary couplings that include a plurality of rolling elements. A retainer typically includes pockets that constrain the rolling elements to maintain a desired angular spacing between the rolling elements.

Conventional retainers are made from a variety of materials in order to suit a particular application and production volume. For example, when production volume is high, retainers are typically made of steel or polymers. When production volume is low, retainers are typically made of brass or bronze. Additionally, brass and bronze offer superior tribological (i.e., lubrication and wear) characteristics compared to steel.

Conventional retainers are made by a variety of manufacturing processes in order to suit a particular production volume. For high-volume manufacturing, retainers can be manufactured by a stamping process for steels or by an injection molding process for polymers. These processes can produce parts quickly and relatively inexpensively, but they require large initial tooling investments. As such, these processes are riot suitable for low-volume manufacturing. For low-volume manufacturing, retainers can be machined from a solid block casting or rolled forging. Although machining requires less tooling investment, it can be time consuming and expensive.

SUMMARY OF THE INVENTION

The invention provides, in one aspect, a retainer for maintaining a relative angular spacing of a plurality of rolling elements. The retainer includes a body having an annular portion and a plurality of engaging portions. Each of the engaging portions is configured to engage at least one of the rolling elements. The body is made of a sintered powdered metal infiltrated with bronze.

The invention provides, in another aspect, a bearing assembly including an inner raceway, an outer raceway, and a plurality of rolling elements. The rolling elements are disposed between the inner raceway and the outer raceway. The bearing assembly also includes a retainer for maintaining a relative angular spacing of the rolling elements. The retainer is made of a sintered powdered metal infiltrated with bronze.

The invention provides, in another aspect, a method of manufacturing a retainer for maintaining a relative angular spacing of a plurality of rolling elements. The method includes forming a body of the retainer from powdered metal using an additive manufacturing process.

Other features and aspects of the invention will become apparent by consideration of the following detailed description and accompanying drawings.

Figure 1:
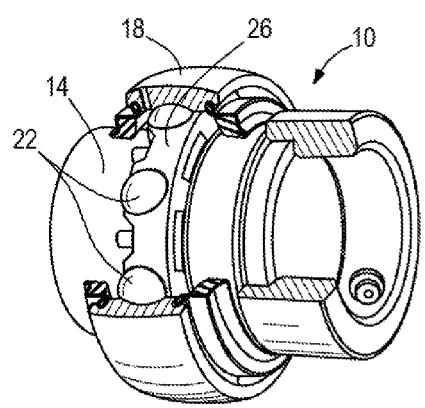
FIG. 1 is a cutaway view of a typical ball bearing including a retainer that can be manufactured by a method in accordance with the invention.
Figure 2:
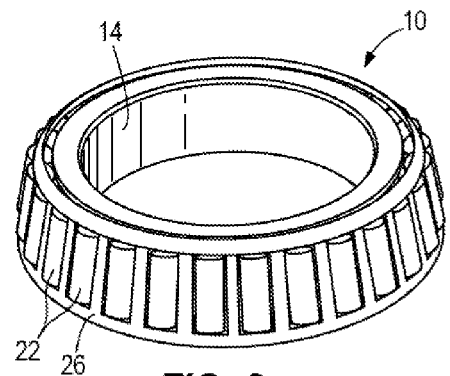
FIG. 2 is a perspective view of a typical tapered roller bearing including a retainer that can be manufactured by a method in accordance with the invention.
Figure 3:
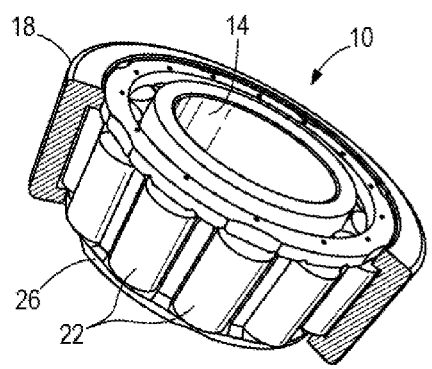
FIG. 3 is a cutaway view of a typical cylindrical roller bearing including a retainer that can be manufactured by a method in accordance with the invention.
Figure 4:
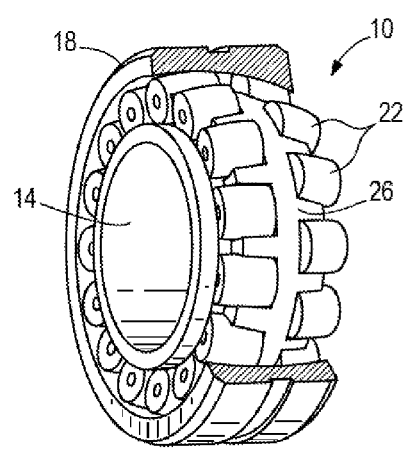
FIG. 4 is a cutaway view of a typical spherical roller bearing including a retainer that can be manufactured by a method in accordance with the invention.
Figure 5:
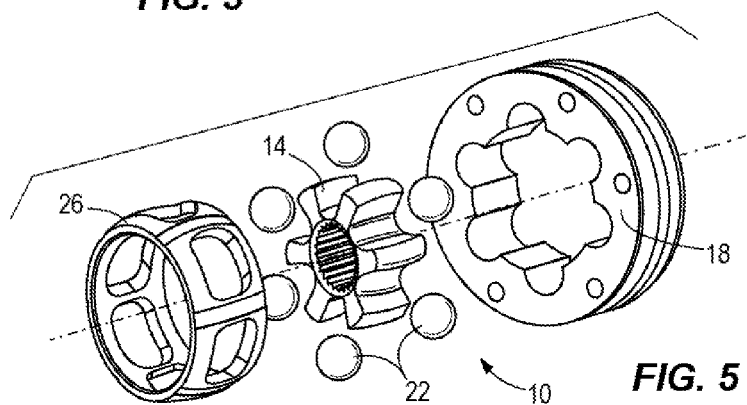
FIG. 5 is an exploded view of a typical constant velocity joint including a retainer that can be manufactured by a method in accordance with the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate a variety of exemplary antifriction hearings 10, each of which includes an inner raceway 14, an outer raceway 18 (not shown in FIG. 2), a plurality of rolling elements 22 arranged and positioned between the raceways 14, 18, and a retainer 26. The retainer 26 maintains separation of the rolling elements 22 and guides the rolling elements 22 for uniform rotation with respect to the inner and outer raceways 14, 18.

Figure 6:
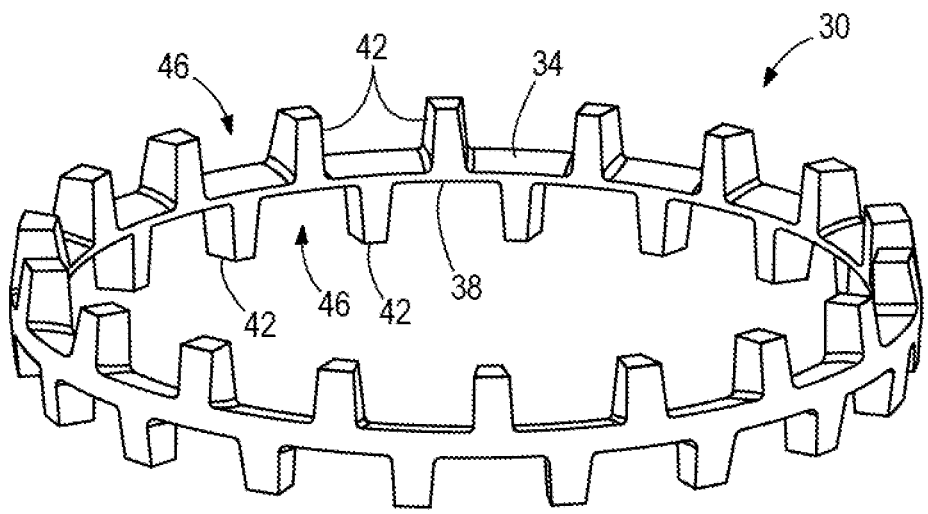
FIG. 6 is a perspective view of a retainer in accordance with an embodiment of the invention.

FIG. 6 illustrates a retainer or cage 30 according to an embodiment of the invention. The retainer 30 of FIG. 6 may be assembled, for example, as pail of a double-row spherical roller bearing. The retainer 30 includes a body 34 having an annular portion 38 and a plurality of engaging portions 42 extending axially from the annular portion 38. Adjacent engaging portions 42 define pockets 46 that can receive a complement of rolling elements (not shown).

Figure 7:
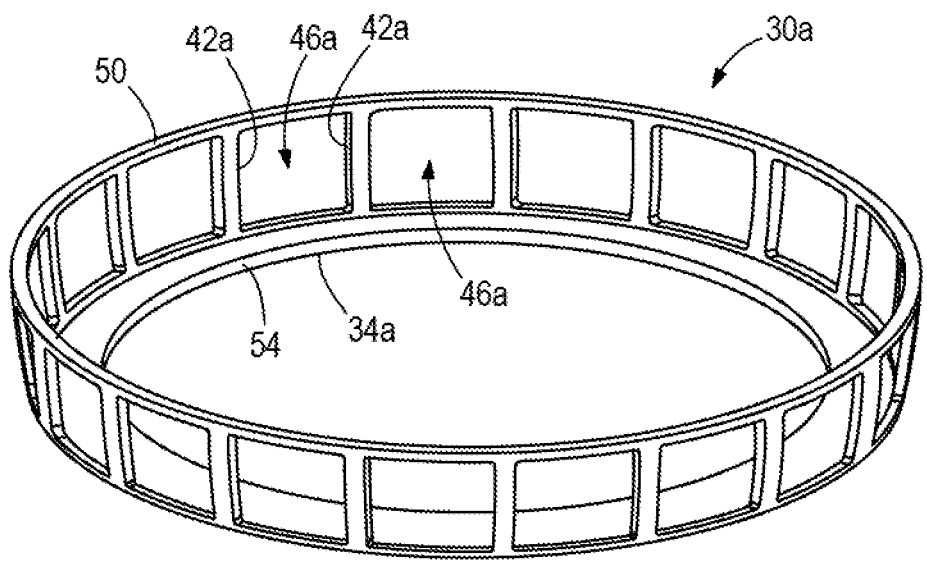
FIG. 7 is a perspective view of a retainer in accordance with another embodiment of the invention.

FIG. 7 illustrates a retainer 30a according to another embodiment of the invention. The retainer 30a is similar to the retainer 30 of FIG. 6, and like components are given like reference numerals with the letter "a." The retainer 30a of FIG. 7 may be assembled, for example, as part of a spherical or cylindrical roller bearing. The retainer 30a includes a body 34a having two, axially-spaced rings 50, 54 interconnected by a plurality of engaging portions 42a. Adjacent engaging portions 42*a* define pockets 46*a* that can receive a complement of rolling elements (not shown).

A method of manufacturing any of the retainers 26, 30, 30*a* illustrated in FIGS. 1-7, as well as other retainers not illustrated or described herein, in accordance with the invention is described below.

The body 34, 34*a* of the retainer 30, 30*a* is formed from powdered metal by an additive manufacturing process, and more specifically by a three-dimensional (3D) printing process. Unlike subtractive manufacturing processes (e.g., machining) that remove material in order to form a finished part, additive manufacturing processes progressively add material to form a finished part.

To produce the retainer 30, 30*a*, a slicing algorithm first divides a 3D computer or CAD model of the retainer 30, 30*a* into numerous thin slices or layers along a central axis of the retainer 30, 30*a*. layer data from the slicing, algorithm is then sent to and interpreted by a 3D printing apparatus (not shown) which, as described in further detail below, can sequentially construct the retainer 30, 30*a* layer by layer to produce a complete part.

The 3D printing apparatus can include a powder bed, a spreader, and a printing head. It should be understood that the 3D printing apparatus can be configured in any manner and can include any number and variety of other components and features. Each layer of the retainer 30, 30*a* begins with a thin distribution of powdered metal spread over a surface of the powder bed by the spreader. In some embodiments the powdered metal can be iron. In other embodiments, the powdered metal can be mild or low carbon steels. Mild steels have a carbon content between about 0.3% and about 0.6%, while low carbon steels have a carbon content of about 0.3% or less. In still other embodiments, the powdered metal can be mild steel having a carbon content of about 0.15% or less. In yet other embodiments, the powdered metal can be stainless steel, such as 316 stainless steel or 420 stainless steel. Alternatively, the powdered metal can be any other metal or metal alloy.

The printing head then selectively joins particles of the powdered metal that make up a particular layer of the retainer 30, 30*a*. In some embodiments, the printing head dispenses a binder material or adhesive to join the powder particles. In other embodiments, the printing head includes a laser that melts or sinters targeted areas to join the powder particles. Once the powdered metal particles are joined to form a cohesive layer, the powder bed is lowered and the spreader applies the next powder layer on top of the partially-constructed retainer 30, 30*a*. This layer-by-layer process repeats until the retainer 30, 30*a* is completely formed within a surrounding area of unbound metal powder.

Next, for embodiments where the powder particles are joined by binder or adhesive, the retainer 30, 30*a* can be heated to an elevated temperature for a predetermined time period in order to cure the binder or adhesive and strengthen the retainer 30, 30*a*. Once the retainer 30, 30*a* has cured, the surrounding unbound powder is removed from the retainer 30, 30*a* using vibration, vacuum, high velocity air, or any other suitable method. Alternatively, the surrounding unbound powder can be removed before the curing process.

The retainer 30, 30*a* is then heated in a sintering process for additional strengthening. During sintering, the retainer 30, 30*a* is heated in a furnace and held at a temperature less than a melting temperature of the powdered metal for a predetermined time period (e.g., 12-36 hours). The sintering process can burn off any binder or adhesive, and accelerates molecular diffusion to bond the powdered metal together. In other embodiments, such as those where the powder particles are joined by laser sintering, the curing and/or sintering processes can be omitted.

The sintered retainer 30, 30*a* is generally a porous structure having, a density between about 50% and about 70% of a theoretical density of the powdered metal material (i.e., the density of the metal in wrought form). Depending on the desired application, the retainer 30, 30*a* can be used as a finished part in this state, or may undergo additional machining, treatment, or polishing. In other embodiments, the porous retainer 30, 30*a* can be infiltrated with another material, such as a lower inciting temperature metal, to increase the density of the retainer 30, 30*a* and provide it with desirable properties. More specifically, it has been found that infiltration of the porous retainer 30, 30*a* with bronze or copper increases the density and strength, reduces porosity, and provides superior tribological characteristics (i.e., reduces wear and/or friction experienced by the retainer and/or rolling elements during operation).

The infiltration process can constitute a separate heating process or can be performed concurrently or sequentially with the sintering process. A predetermined quantity of infiltrant (e.g., bronze powder) is deposited over the retainer 30, 30*a*, then heated to a temperature above the melting point of the infiltrant. Gravity, capillary action, and/or pressure draws the melted infiltrant into the porous retainer 30, 30*a* until the infiltrated retainer 30, 30*a* has a porosity less than or equal to about 30%. In some embodiments the infiltrated retainer 30, 30*a* has a porosity less than or equal to about 20%. In other embodiments the infiltrated retainer 30, 30*a* has a porosity less than or equal to about 10%. In still other embodiments, the infiltrated retainer 30, 30*a* has a porosity less than or equal to about 5%.

The infiltrated retainer 30, 30*a* possesses both the strength benefits of the base metal (e.g., mild steel, stainless steel, etc.) and the tribological benefits of the infiltrant, thereby eliminating the compromise required when selecting conventional retainer materials. For example, a retainer manufactured from mild steel powder infiltrated with bronze in accordance with the method described above has superior strength compared to a conventional brass or bronze retainer and superior tribological characteristics compared to a conventional steel retainer.

The use of additive manufacturing processes such as 3D printing has many advantages in the manufacturing of retainers. For example, the process requires no tooling, thus small and medium production volumes can be made cost effectively. For high production volumes, a conventional powder metal compaction and sintering process can be used to create a porous powder metal retainer, which can then be infiltrated in the manner described above.

Figure 8:
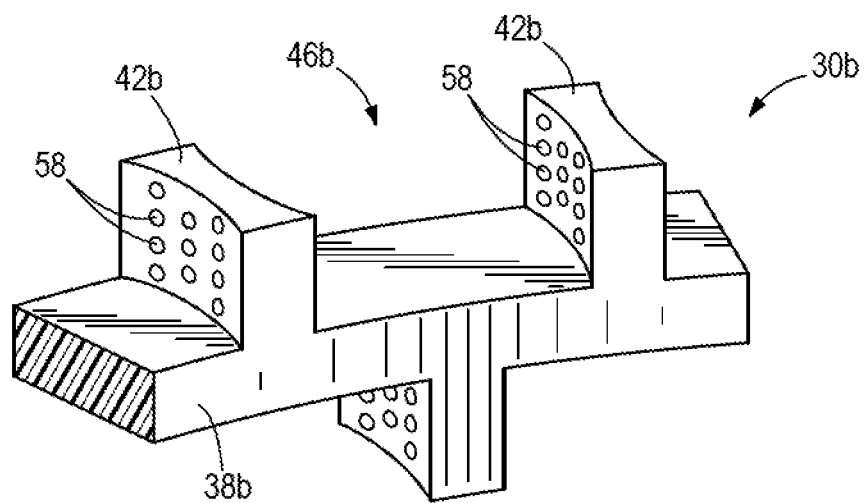
FIG. 8 is a perspective view of a portion of a retainer in accordance with another embodiment of the invention.

FIG. 8 illustrates a retainer 30*b* according to another embodiment of the invention. The retainer 30*b* is similar to the retainer 30 of FIG. 6, and like components are given like reference numerals with the letter "b." The retainer 30*b* includes an annular portion 38*b* and a plurality of engaging portions 42*b* that define pockets 46*b* for receiving a plurality of rolling elements (not shown). Each of the engaging portions 42*b* includes dimples 58 that can retain lubricant, reduce an overall weight of the retainer 30*b*, and reduce a contact area between the engaging portions 42*b* and the rolling elements.

Figure 9:
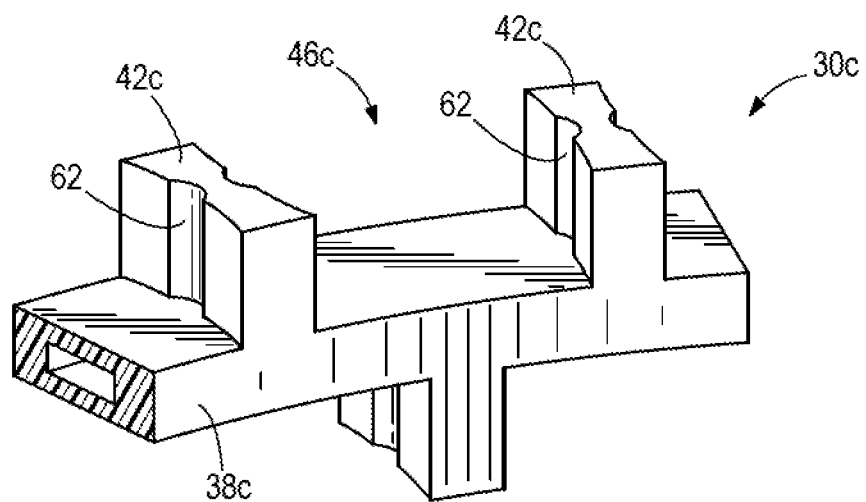
FIG. 9 is a perspective view of a portion of a retainer in accordance with another embodiment of the invention.

FIG. 9 illustrates a retainer 30*c* according to another embodiment of the invention. The retainer 30*c* is similar to the retainer 30 of FIG. 6, and like components are given like reference numerals with the letter "c." The retainer 30*c* includes an annular portion 38*c* and a plurality of engaging portions 42*c* that define pockets 46*c* for receiving a plurality of rolling elements (not shown). Each of the engaging portions 42c includes a recessed area or channel 62 that can retain lubricant, reduce an overall weight of the retainer 30c, and reduce a contact area between the engaging portions 42c and the rolling elements. In addition, the annular portion 38c is substantially hollow to reduce an overall weight of the retainer 30c.

The retainers 30b, 30c of FIGS. 8 and 9 incorporate features and geometries that are easily producible with the 3D printing process described above, but otherwise cost prohibitive or not possible with traditional manufacturing methods.

In some embodiments, any of the retainers 30, 30a, 30b, 30c described herein may undergo one or more finishing processes to improve the surface finish, dimensional accuracy, corrosion resistance, wear resistance, hardness, or appearance of the engaging portions 42, 42a, 42b, 42c. Such finishing processes may be particularly advantageous in high performance and high precision bearing applications. The engaging portions 42, 42a, 42b, 42c can be finished by machining, mass finishing (e.g., tumble: or vibratory finishing), superfinishing, polishing, or any other finishing process.

Various features of the invention are set forth in the following claims.

What is claimed is:

1. A retainer for maintaining a relative angular spacing of a plurality of rolling elements, the retainer comprising:
   a body including an annular portion and a plurality of engaging portions, each of the engaging portions configured to engage at least one of the plurality of rolling elements, wherein the body is made of a sintered powdered metal infiltrated with bronze such that the infiltrated retainer has a porosity less than or equal to 30%.

2. The retainer of claim 1, wherein the engaging portions are finished by machining.

3. The retainer of claim 1, wherein the engaging portions are finished by mass finishing.

4. The retainer of claim 1, wherein the body is made of stainless steel infiltrated with bronze.

5. The retainer of claim 4, wherein the body is made of 316 or 420 stainless steel infiltrated with bronze.

6. The retainer of claim 1, wherein the body is made of mild steel or low carbon steel infiltrated with bronze, the mild steel having a carbon content between about 0.3% and about 0.6% and the low carbon steel having a carbon content of about 0.3% or less.

7. The retainer of claim 1, wherein the body is made of iron infiltrated with bronze.

8. The retainer of claim 1, wherein at least one of the engaging portions includes a dimple for retaining lubricant between the at least one engaging member and one of the rolling elements.

9. The retainer of claim 1, wherein the annular portion includes at least one hollow section.

10. The retainer of claim 1, wherein at least one of the engaging portions includes a recessed portion for reducing a contact area between the at least one engaging portion and one of the rolling elements.

11. The retainer of claim 1, wherein the annular portion includes at least one recess for reducing the weight of the annular portion.

12. A bearing assembly comprising:
   an inner raceway;
   an outer raceway;
   a plurality of rolling elements disposed between the inner raceway and the outer raceway; and
   a retainer for maintaining a relative angular spacing of the rolling elements,
   wherein the retainer is made of a sintered powdered metal infiltrated with bronze such that the infiltrated retainer has a porosity less than or equal to 30%.

13. A method of manufacturing a retainer for maintaining a relative angular spacing of a plurality of rolling elements, the method comprising:
   forming a body of the retainer from powdered metal using an additive manufacturing process; and
   infiltrating the body of the retainer with bronze such that the infiltrated retainer has a porosity less than or equal to 30%.

14. The method of claim 13, wherein infiltrating the body of the retainer with bronze increases the density and reduces the porosity of the body.

15. The method of claim 13, wherein infiltrating the body of the retainer with bronze improves tribological characteristics of the retainer.

16. The method of claim 13, wherein forming the body includes sequentially forming a plurality of layers of powdered metal and binding the plurality of layers with an adhesive.

17. The method of claim 13, wherein the additive manufacturing process is a 3D printing process.

18. The method of claim 13, wherein forming the body of the retainer includes forming an annular portion and a plurality of engaging portions, each of the engaging portions configured to engage at least one of the rolling elements.

19. The method of claim 18, further comprising finishing the engaging portions using a machining process.

20. The method of claim 18, further comprising finishing the engaging portions using a mass finishing process.

21. The method of claim 18, wherein forming the body includes forming a dimple in at least one of the engaging portions for retaining lubricant between the at least one engaging portion and one of the rolling elements.

22. The method of claim 18, wherein the annular portion includes at least one hollow section.

23. The method of claim 18, wherein at least one of the engaging portions includes a recessed portion for reducing a contact area between the at least one engaging portion and one of the rolling elements.

24. The method of claim 18, wherein the annular portion includes at least one recess for reducing the weight of the annular portion.

* * * * *